No. 657,398. Patented Sept. 4, 1900.
A. A. DAY.
APPARATUS FOR PREPARING AND FEEDING FUEL.
(Application filed May 2, 1900.)
(No Model.)

WITNESSES:
L. C. Hills
J. K. Moore

INVENTOR
Albert A. Day
BY Whitaker Prevost
Attorneys

UNITED STATES PATENT OFFICE.

ALBERT A. DAY, OF NEW YORK, N. Y.

APPARATUS FOR PREPARING AND FEEDING FUEL.

SPECIFICATION forming part of Letters Patent No. 657,398, dated September 4, 1900.

Application filed May 2, 1900. Serial No. 15,263. (No model.)

*To all whom it may concern:*

Be it known that I, ALBERT A. DAY, a citizen of the United States, residing in the city of New York, (Brooklyn,) in the county of Kings and State of New York, have invented certain new and useful Improvements in Apparatus for Preparing and Feeding Fuel; and I do hereby declare the following to be a full, clear, and exact description of the invention, such as will enable others skilled in the art to which it appertains to make and use the same.

My present invention relates to apparatus for preparing and feeding fuel in finely-divided conditions to furnaces, and, more particularly stated, is an improvement upon the construction shown, described, and illustrated in my prior Letters Patent, No. 634,552, of October 10, 1899; and it consists in certain novel features of construction and combination of parts whereby improved results and greater efficiency are obtained.

The best form in which I have contemplated embodying my present invention is illustrated in the accompanying drawings, and my said invention is disclosed in the following description and claims.

My said invention relates more particularly to the construction of the pulverizing-chamber, the devices connected therewith, and the combination of such construction, whereby the operation of pulverizing the fuel is more economically and efficiently effected.

Figure 1:
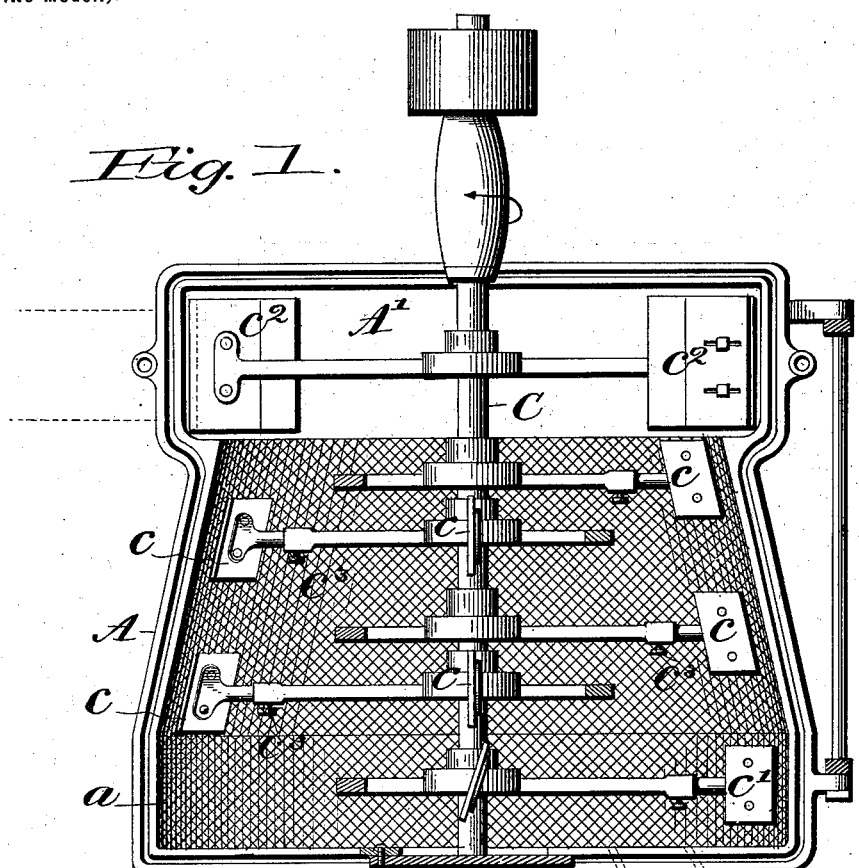
Figure 2:
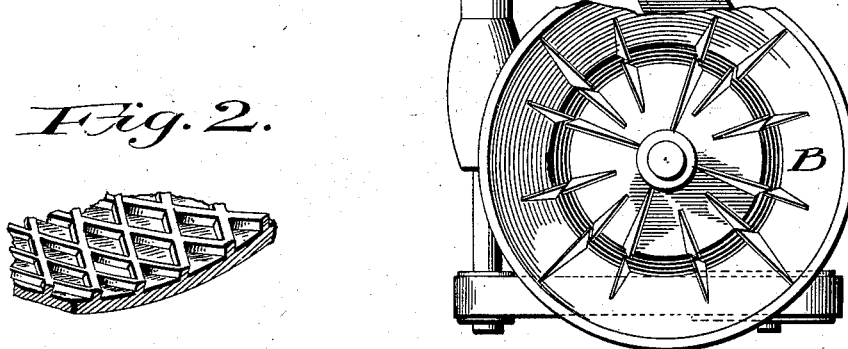

Figure 1 is a plan view of the apparatus or pulverizing-chamber with the upper portion removed, together with the parts connected thereto. Fig. 2 is a detail showing the ribbed surface of the interior of the pulverizer-casing.

In said figures of drawings, A designates the casing of the pulverizing-chamber. The main portion of the casing is in the form of a truncated cone disposed in a horizontal position, with the side walls of the casing tapering inward toward the outlet end of the same, where the casing connects with an annular trough A'. At the opposite end the casing is provided with a cylindrical portion $a$, forming an extension of the walls of the casing. In other respects than those already and hereinafter described my present pulverizing-chamber is constructed in the general form and manner set forth in my earlier patent, hereinbefore particularly referred to. It has connected with it a breaking and grinding mechanism B, similar to the breaking and grinding mechanism of my said patent, and this breaking and grinding mechanism is connected with the pulverizing-chamber in substantially the same manner as the breaking and grinding mechanism of my said patent for the purpose of delivering the material or fuel to the pulverizer after it has been acted upon by the breaking and grinding mechanism.

C designates a horizontal shaft which passes centrally through the casing A, within which it is provided with fan or pulverizing blades $c$. These blades, as in my former patent, have their outer edges parallel to the conical wall of the casing, and said blades are set parallel to the shaft C or the axis of the conical casing. This said shaft is also provided within the cylindrical portion $a$ of the casing with other fan-blades $c'$, which are set at an angle to the said shaft in the manner indicated, so as to effect the feeding of the material forward toward the outlet end of the pulverizer and to prevent any backward movement of the broken fuel delivered to the pulverizer from the breaking and grinding device.

Within the trough A' of the casing the shaft C is provided with fan-blades $c^2$, which act to produce a blast for ejecting the powdered material and delivering it to the furnace.

The inner surface of the casing A throughout its tapering and cylindrical portions is preferably provided with slight corrugations or a network of slightly-projecting ribs to hold and retard the unpulverized material, so as to enable the pulverizing-blades $c$ $c'$ to act more efficiently upon the same. The projecting portions of this roughened surface rise above the main portion of the surface but a short distance, from one-sixteenth of an inch upward, as may be found most desirable. In this case I have shown each of the pulverizer-blades attached to a short arm or rod, which is secured in a socket on the main blade-arm by a set-screw $c^3$, so that the blades can readily be adjusted to the position desired. This is more particularly desirable in respect to the blades $c'$, as they are designed to first engage the broken fuel as it comes from the grinder B. These blades are set at an angle to feed the fuel forward and prevent any backward tendency of the material, while they also act to grind and comminute the same. The walls of the conical portion of the casing act to retard the coarser particles in their passage through the pulverizer and hold them until reduced to the fineness desired. Some slight angular adjustment of the blades *c* may at times be desirable to cause them to facilitate or retard the passage of the fuel; but the adjustment of the blades *c'* will ordinarily be sufficient to accomplish the result sought.

What I claim, and desire to secure by Letters Patent, is—

1. In an apparatus for preparing and feeding fuel, a pulverizing-chamber of the form of a truncated cone, having a cylindrical portion at its larger end the said cylindrical portion being the receiving end of the chamber and the smaller end of the conical part the discharging end, substantially as described.

2. In an apparatus for preparing and feeding fuel, the combination with the pulverizing-chamber of the form of a truncated cone having a cylindrical portion adjacent to its larger end, of a series of revolving pulverizing-blades within the said chamber, the blades within the cylindrical portion being set at an angle to the axis of the chamber to feed the fuel forward and the other blades set at other and different angles, substantially as described.

In testimony whereof I affix my signature in the presence of two witnesses.

ALBERT A. DAY.

Witnesses:
W. H. PARRIS,
WM. J. SMITH.